United States Patent [19]

Bosson et al.

[11] 4,120,370

[45] Oct. 17, 1978

[54] WEIGHING EQUIPMENT

[75] Inventors: Jorgen Bosson; Gunnar Cragfors, both of Vesteras, Sweden

[73] Assignee: Asea Aktiebolag, Vasteras, Sweden

[21] Appl. No.: 695,386

[22] Filed: Jun. 14, 1976

[30] Foreign Application Priority Data

Aug. 28, 1975 [SE] Sweden ................. 7509541

[51] Int. Cl.² ............... G01G 23/10; G01G 19/18
[52] U.S. Cl. ................. 177/185; 177/210 EM; 177/147; 328/167
[58] Field of Search ......... 177/147, 210 AP, 210 EM, 177/210 C, 210 R, 211, 212, 185; 328/167

[56] References Cited

U.S. PATENT DOCUMENTS

| | | | |
|---|---|---|---|
| 3,565,194 | 2/1971 | Engle | 177/210 R X |
| 3,643,753 | 2/1972 | Godwin | 177/210 R X |
| 3,714,588 | 1/1973 | DeBoo | 328/167 |
| 3,802,522 | 4/1974 | Thompson | 177/212 X |
| 3,835,399 | 9/1974 | Holmes | 328/167 |
| 3,912,029 | 10/1975 | Gorman | 177/210 R |
| 4,039,036 | 8/1977 | Baumgartner | 177/210 EM |

Primary Examiner—Joseph W. Hartary
Attorney, Agent, or Firm—Watson, Cole, Grindle & Watson

[57] ABSTRACT

Weighing equipment for weighing a load which is included in a mechanical system with a natural frequency of oscillation which depends on the size of the load, for example in a crane, includes a transducer influenced by the load and which delivers a signal corresponding to the weight of the load. The equipment includes a tunable band exclusion filter connected to the transducer for filtering the signal, in which the signal influences the tuning of the filter so that its anti-resonance frequency follows said natural frequency of the oscillation.

10 Claims, 4 Drawing Figures

WEIGHING EQUIPMENT

BACKGROUND OF THE INVENTION

1. Field of the Invention

The present invention relates to weighing equipment for weighing a load, which is included in a mechanical system with a natural frequency of oscillation which depends on the size of the load, comprising a transducer influeced by the load and arranged to emit a signal commensurate to the weight of the load.

2. The Prior Art

A typical field of use for an equipment of this kind is in a so-called crane scale. The equipment is then built into a crane, for example an overhead crane, and is used for indicating the weight of the load. The transducer may be, for example, a strain gauge or alternatively a magnetoelastic force transducer. In the cases it is often desirable to obtain a quick and exact reading of the weight of the load. However, obtaining such a quick and reliable reading has proved to offer serious problems, because the load and the wires in which the load is suspended together form a mechanical oscillating system. The load will perform vertical oscillations with a frequency which is determined by the mass of the load and the elasticity of the wires. These oscillations give rise to such strong variations in the force influencing the transducer that it becomes impossible to obtain a sufficiently exact reading of the weight of the load within a reasonable time. The frequency of the oscillation will in all typical cases be very low, for example of the order of magnitude of 2-10 Hz. Conventional filters are impractically slow, and further give rise to a considerable delay upon changes in the load. One further problem is that the load is normally variable, which means that the frequency of the oscillation may vary within relatively wide intervals.

SUMMARY OF THE INVENTION

The invention aims to provide a weighing device which, with a small delay, provides a good filtering of disturbances with frequencies down to a few Hz. This is achieved according to the invention by using equipment which comprises a tunable band exclusion filter, for filtering the signal from the transducer, and arranging for the signal to influence the tuning of the filter so that its anti-resonance frequency follows the natural frequency of the oscillation.

BRIEF DESCRIPTION OF THE DRAWINGS

In the following the invention will be described with reference to the accompanying figures.

DESCRIPTION OF THE PREFERRED EMBODIMENTS

Figure 1:
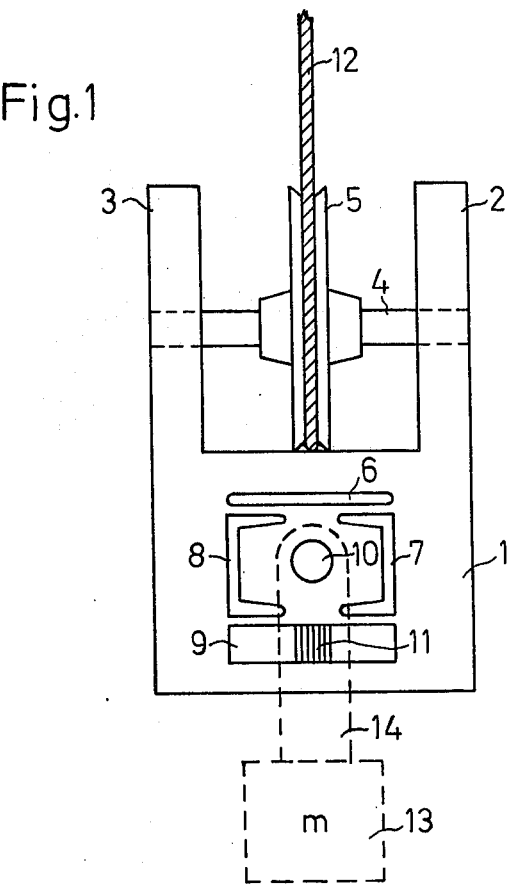
FIG. 1 shows how a transducer of electromagnetic type may be arranged in a crane balance.

FIG. 1 shows how, in a crane scale equipment with a magnetoelastic transducer, the transducer can be arranged in the lower hoist block which supports the load. The block 1 has two lugs 2 and 3 with holes for a shaft 4 on which one or more pulleys 5 are arranged. In the block there are arranged through-recesses 6, 7, 8 and 9 and a through-hole 10. In the recess 9 the magnetoelastic force transducer 11 itself is arranged. In the hole 10 there may be applied a shaft pin on which the load is suspended. The load 13 with the mass $m$ and its suspension device 14 are only schematically shown in the figure. Because of the recesses, 6, 7 and 8, the configuration of which are known per se, the weight of the load will influence the transducer 11, and in a manner which will be described below a signal commensurate with the weight of the load is obtained from the transducer. The block 1 may, for example, constitute the lower block in an overhead crane. The block is suspended from the lines 12 which, in their upper part, pass through the upper block of the crane, which upper block is placed in the crab. The load 13 may, for example, consist of a ladle for transporting molten metal. In equipment of this kind, the lines 12 may have a considerable length and, similarly, the mass $m$ of the load is often relatively great. As a result of vertical crane movements, slightly damped vertical oscillations will be performed by the load 13 and the lower block 1. These oscillations, as already mentioned, will in typical cases have a very low frequency of the order of magnitude of between a few Hz and some tens of Hz. The angular frequency $\omega$ of the oscillation is obtained in a known manner from the expression $$\omega = \sqrt{k/m}$$

where $k$ is the spring constant of the lines and $m$ the gross load.

Figure 2:
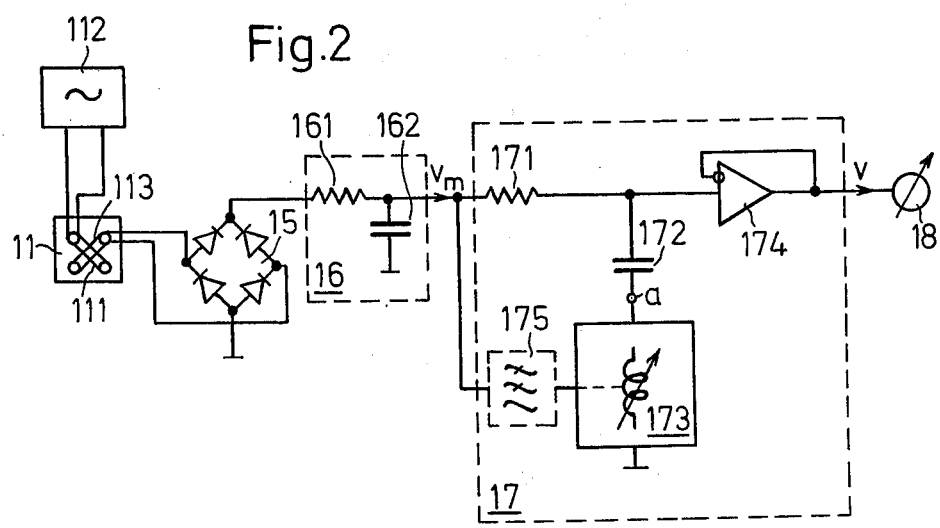
FIG. 2 shows a schematical circuit diagram of the equipment according to the invention.

FIG. 2 shows schematically the circuit diagram of weighing equipment according to the invention. In a previously well-known manner, the transducer 11 has four holes and two crossed windings 111 and 113. The winding 111 is supplied with alternating current of, for example, a frequency of 50 Hz from a feeding device 112. When a force affects the transducer 11 a reluctive anisotrophy is obtained (that is, different magnetic properties in different directions) in the sheets of the stack of sheets from which the transducer is built up, and an alternating voltage is induced in the winding 113. This voltage is rectified in the diode bridge 15, and in the low-pass filter 16 are filtered out high-frequency compounds of a frequency of 50 Hz or higher. The low-pass filter is schematically shown as, and may be constituted by, a capacitor 162 and a resistor 161. The transducer as well as its feeding device and the equipment for rectifying and filtering the measuring signal are well known. The output signal from the low-pass filter 16 is designated $v_m$. It is a direct voltage signal, the magnitude of which corresponds to the weight of the load. Because of the above-mentioned oscillations of the load, however, an alternating signal of a very low frequency will be superimposed on the mean value of the signal. The signal $v_m$ is supplied to a band exclusion filter 17. In the example shown, this is constituted by a resistor 171 and a series resonance circuit comprising a capacitor 172 and an inductive element 173. The inductive element is schematically shown as a variable reactor, but an element with the corresponding properties can be realized in a great many other ways. The signal $v_m$ is supplied to the inductive element 173 and influence the inductance of said element. When $v_m$ is varied, the inductance of the element 173 varies and thus the anti-resonance frequency of the band exclusion filter 171, 172 and 173 also varies. The resonance frequency $\omega_r$ of the band exclusion filter is obtained from the relationship $$\omega_r = 1/\sqrt{LC}$$

where C is the capacitance of the capacitor 172 and L the inductance of the inductive element 173. As mentioned above, the frequency of the low-frequency oscillations varies with the mass m of the load. However, the signal $v_m$ is, as mentioned, a measure of the mass of the load. According to the invention, the system is now designed so that the anti-resonance frequency of the band exclusion filter is always caused to correspond to the frequency of the low-frequency oscillations, i.e. $\omega = \omega_r$. This is achieved (see the above expressions for $\omega$ and $\omega_r$) if $$L = (m/k \cdot C)$$

Thus, L is to vary proportionally to m.

By a suitable choice of the resistance of the resistor 171, the Q value of the filter can be appropriately set. Preferably, the resistance is chosen so that Q = 1 at the lowest frequency present in said oscillations, which provides an optimal operation of the band exclusion filter. The output signal from the band exclusion filter is supplied to an operational amplifier 174, which increases the power level of the signal. The output signal v from the operational amplifier constitutes a correct value of the weight of the load, by correct being meant that the influence of said low-frequency oscillations is to a high degree eliminated. The signal v can be made to constitute an accurate measure of the weight of the load, in the manner described, and the signal can be made to follow alterations of the load weight with a high accuracy. The signal v is supplied to a schematically shown indicating means 18, which may be of analogue or digital type, for example a pointer instrument or a digital display. Of course, the signal can instead, or also, be supplied to calculating means which require information about the weight of the load.

It may be suitable to low-pass-filter the signal $v_m$ before it is supplied to the inductive element 173 to influence this element. A low-pass filter 175 for this purpose is shown in the figure. In the embodiment shown in FIG. 2, the anti-resonance frequency of the band exclusion filter is controlled by the signal $v_m$. Another possibility is to let the output signal v from the band exclusion filter control the anti-resonance frequency of the filter.

Figure 3:
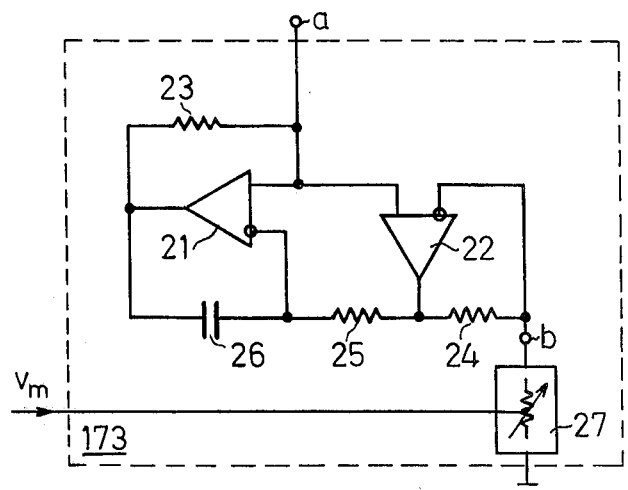
FIG. 3 shows a preferred embodiment of the inductive unit included in the band exciusion filter.

Because of the low frequency of the above-mentioned oscillations, typically 2-10 Hz, the inductance of the inductive element in the band exclusion filter 17 must be very great. It is therefore suitable to design it as an active connection with operational amplifiers according to the diagram in FIG. 3. Such a circuit which has the properties of a controllable inductance may be formed in many ways. However, FIG. 3 shows a circuit which has been found in practice to afford great advantages. It consists of two operational amplifiers 21 and 22, each with a non-inverting and an inverting input. The amplifier 21 has positive feed-back over the resistor 23 and negative feed-back over the capacitor 26. The amplifier 22 has negative feed-back over the resistor 24. The output signal of the amplifier 22 is supplied to the inverting input of the amplifier 21 by way of a resistor 25. The inverting input of the amplifier 22 is connected to earth by way of a controllable resistor 27. The circuit operates as a controllable inductance in relation to a signal which is supplied to the input of the circuit, said input being marked a in FIGS. 2 and 3. In FIG. 3 it is schematically shown that the signal $v_m$ is passed to the resistor 27 to control this resistor and thus also the inductance of the circuit 173. It can be easily proved that the circuit 173, for a signal applied to the terminal a, acts as a pure, loss-free inductance. The magnitude L of the inductance is determined from the relationship $$L = (C \cdot R1 \cdot R2 \cdot R4/R3)$$

where C is the capacitance of the capacitor 26; R1 is the resistance of the resistor 23; R2 is the resistance of the resistor 25; R3 is the resistance of the resistor 24 and R4 is the resistance of the controllable resistor 27. The embodiment according to FIGS. 2 and 3 offers several advantages, among other things in that, by changing one single component, namely the resistor 27, the anti-resonance frequency of the band exclusion filter can be continuously and simply controlled within the desired range.

Figure 4:
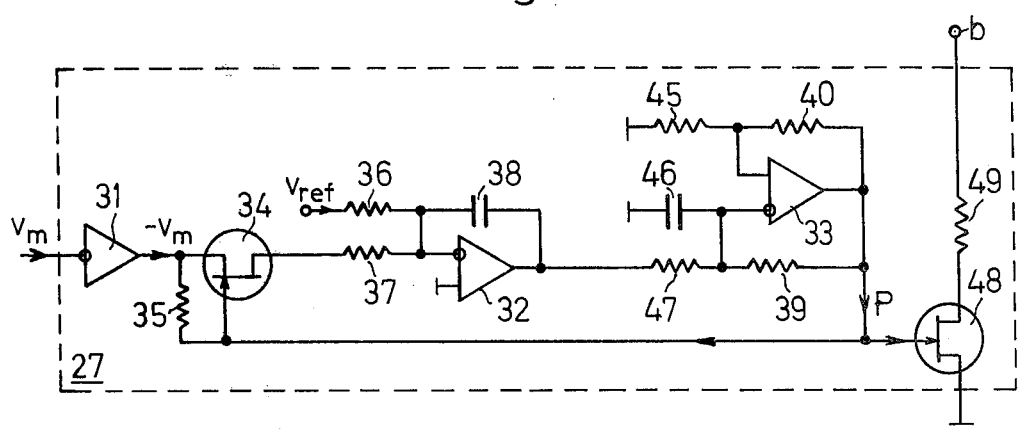
FIG. 4 shows how the control of the resistor included in the inductive unit can be achieved.

FIG. 4 shows a preferred example of the embodiment of the controllable resistor 27. The circuit 27 is connected between earth and the point b in FIG. 3, and it is thus the resistance between b and earth that is to be controlled. Between terminal b and earth there lies a resistor 49 in series with a field effect transistor 48. The transistor is supplied with a square wave P with a suitable frequency, for example 1 or 2 kHz. The square voltage make the transistor alternately conducting and non-conducting. By varying the relation between the lengths of the non-conducting and the conducting intervals during each period, the resistance of the circuit 27 can be varied between the resistance of the resistor 49 and infinity. For controlling the resistance value of the circuit 27, the circuit is supplied with the signal $v_m$. This is inverted in an operational amplifier 31. The signal $-v_m$ is supplied to an operational amplifier 32 by way of a field effect transistor 34 and a resistor 37. This amplifier 32 has a feedback capacitor 38 and thus operates as an integrator. Also a fixed signal $v_{ref}$ is passed to the input of the amplifier 32 through the resistor 36. The field effect transistor 34 is controlled by the same signal as controls the transistor 48, and the signal $v_m$ is thus chopped with the same pulse length-period relation as that by which the transistor 48 is controlled. If the relation between conducting time and period time of the transistor 34 and 48 is designated p, the integrator 32 is supplied with the signal $-v_m \cdot p$ through the resistor 37.

An operational amplifier 33 is connected so that it constitutes a pulse length modulator which delivers the above-mentioned square voltage with a controllable pulse length-period relation. The amplifier has positive feedback by way of the resistor 40 and negative feedback by way of resistor 39. Its non-inverting input is connected, by way of resistor 45, to earth and the inverting input is connected to earth by way of the capacitor 46. The output signal from the integrator 32 is supplied to the inverting input of the amplifier 33 by way of resistor 47. The circuit composed of the amplifier 33, the resistors 39, 40 and 45 and the capacitor 46 constitutes a self-oscillating square wave oscillator which, in principle, delivers a symmetrical square wave, whose positive and negative half-waves have equal lengths. If, as now shown in FIG. 4, this circuit is supplied with a signal by way of resistor 47, the output voltage from the modulator circuit will be asymmetrical, that is, the relation between pulse length and period will differ from 0.5. The integrator 32 thus controls the pulse length-period relation to the modulator circuit. Under steady-state conditions the output signal of the integrator is constant, that is, its total input signal is zero. This means that $$v_{ref} = v_m \cdot p$$

that is, $$p = (v_{ref}/v_m)$$

The effective resistance R4 of the circuit 27 becomes $$R4 = (R5/p) = (R5 \cdot v_m/v_{ref})$$

where R5 is the resistance of the resistor 49. If this value is inserted in the above-mentioned expression for L, the following is obtained:

$$L = C \cdot R1 \cdot R2 \cdot R5 \cdot v_m/R3 \cdot v_{ref}$$

The inductance of the element 173 in the band exclusion filter 17 will thus be proportional to the mass of the load, which, as shown above, is the very relationship between these two quantities required for the frequency of the band exclusion filter always to correspond to the natural frequency of the abovementioned oscillating system independent of alterations in the load.

We claim:

1. In a weighing equipment for weighing a load, comprising: means for supporting the load, said load and supporting means being capable of mechanical oscillations with a load dependent natural frequency, a transducer for producing a signal indicative of the weight of the load, a tunable band exclusion filter for filtering said signal and including an input connected to the transducer for receiving said signal and tuning means responsive to said signal for varying the tuning of the filter in accordance with the natural frequency of said mechanical oscillations.

2. Weighing equipment according to claim 1, wherein said tuning means includes means for tuning the filter so that its anti-resonance frequency follows said natural frequency of oscillations.

3. Weighing equipment according to claim 2, wherein said filter includes a shunt path having a capacitor and an inductive unit connected in series with the capacitor, said tuning means further including means for varying the inductance of the inductive unit.

4. Weighing equipment according to claim 3, wherein said tuning means includes means for varying the inductance of the inductive unit proportionally to said load indicative signal.

5. Weighing equipment according to claim 4, wherein the inductance L of said inductive unit is varied in accordance with the formula:

$$L = m/k \times c$$

where $m$ is the mass of the load, $c$ is the capacitance of said capacitor, and $k$ is the spring constant of said supporting means.

6. Weighing equipment according to claim 4, wherein the means for varying the inductance of the inductive unit is an active circuit including amplifying means connected to said capacitor, and a variable resistance means interconnecting an input of said amplifying means to ground, the resistance of said variable resistance means being set in accordance with said load indicative signal.

7. Weighing equipment according to claim 6, wherein said amplifying means includes first and second amplifying means each having an inverting and a non-inverting input, the non-inverting inputs being connected to said capacitor, the inverting input of said first amplifying means being connected to the output thereof through a negative feedback, the non-inverting input of said first amplifying means being connected to the output thereof through a positive feedback means, the inverting input of said second amplifying means and the output thereof being connected to ground through said variable resistance means, and the output of said second amplifying means being connected to the inverting input thereof through second negative feedback means.

8. Weighing equipment according to claim 7, wherein said positive feed back means ia a first resistor, said first negative feedback means is a second capacitor, the output of said second amplifying means is connected to the inverting input of said first amplifying means by a second resistor said second negative feedback means is a third resistor and the inductance of said inductive unit is determined by the following formula:

$$L = C_2 \times R_1 \times R_2 \times R_4/R_3$$

wherein $C_2$ is the capacitance of said second capacitance, $R_1$, $R_2$ and $R_3$ are the respective resistances of said first second and third resistors; and $R_4$ is the resistance of said variable resistance means.

9. Weighing equipment according to claim 7, wherein said variable resistance means includes an active element and a fourth resistor connected to the output of said active element, and means for controlling said active element in accordance with said load indicating signal to vary the current through said fourth resistor, said fourth resistor being connected to the inverting input and the output of said second means for amplifying.

10. Weighing equipment according to claim 9, wherein said means for controlling includes a variable oscillator having a variable pulse width output, means for integrating, means for inverting said load indicator signal and means for amplifying the inverted load indicator signal, said means for integrating being responsive to the amplified, inverted load indicator signal for controlling said variable oscillator, and said means for amplifying the inverted load indicator signal being controlled by said variable pulse width output.

* * * * *